United States Patent

Smith

[15] 3,688,070

[45] Aug. 29, 1972

[54] WORK ENCLOSURE WELDING OF ALUMINUM TUBING OR THE LIKE

[72] Inventor: Harry J. Smith, 1423 Boot Rd., Chester, Pa. 19380

[22] Filed: Feb. 9, 1971

[21] Appl. No.: 114,008

[52] U.S. Cl. .................. 219/60 A, 219/158, 228/6, 269/2
[51] Int. Cl. ............................................. B23k 9/02
[58] Field of Search ...... 219/60 A, 60 R, 61, 158, 72, 219/121, 161, 8.5; 228/44, 4, 6; 269/287, 288, 2

[56] References Cited

UNITED STATES PATENTS

| | | | |
|---|---|---|---|
| 2,590,084 | 3/1952 | Bernard | 219/72 X |
| 3,400,237 | 9/1968 | Kazlauskas | 219/60 A |
| 3,493,711 | 2/1970 | Terselic et al. | 219/72 |
| 3,534,199 | 10/1970 | Downey et al. | 219/161 X |
| 3,031,554 | 4/1962 | Jackson | 219/8.5 X |
| 3,483,352 | 12/1969 | Schollhammer | 219/60 A X |

*Primary Examiner*—R. F. Staubly
*Assistant Examiner*—L. A. Schutzman
*Attorney*—Paul & Paul

[57] ABSTRACT

A work enclosure for facilitating inert gas welding of aluminum tubing has two split hinged collars clamped about the tubing, one on either side of the butt joint to be welded. The circumferential surface of each collar has an outer radially extending flange and an inner shoulder forming a bearing surface adapted to receive one of the side walls of a split housing. The housing has a tubular body portion, the side walls of which have circular openings therein for receiving the collars. The hinged housing when closed has a hooded open window therein to give the workman access to the butt joint to be welded. The housing is movable rotationally on the collars. Means are provided for releasably locking the housing to the collar. To make the weld, the workman moves the housing rotationally step-by-step on the collars about the tubing.

3 Claims, 3 Drawing Figures

PATENTED AUG 29 1972 3,688,070

INVENTOR.
Harry J. Smith
BY
Paul & Paul
ATTORNEYS.

WORK ENCLOSURE WELDING OF ALUMINUM TUBING OR THE LIKE

BACKGROUND OF THE INVENTION

In the construction of electric power utility substations, the buses are now conventionally made of aluminum tubing because of its availability, light weight, rigidity, and also, of course, because it can be welded. Aluminum, however, oxidizes very rapidly. To prevent the aluminum tubing from oxidizing during the welding operation, the welding has been performed by a method in which the welded area is kept flooded with an inert gas, usually argon or helium.

When aluminum tubing is welded outdoors, it has been customary to enclose the work area with tarpaulan windbreaks, or with a tent, to prevent excessive loss of the inert gas. With such enclosures, under conditions of high wind, it may require two hours or more to make a weld because of the inability to maintain the inert environment.

SUMMARY OF THE INVENTION

A principal object of the present invention is to provide a work enclosure for welding of aluminum tubing which avoids the time-consuming building of a windbreak and which is effective to conserve the inert gas to permit welding of a splice to be completed in a substantially shorter period of time than has heretofore been required, as, for example, within a half hour, even in a high wind.

Another object is to provide a work enclosure for the aforesaid purpose which is simple in construction, which may be readily and quickly affixed to the tubing at the place where the work is to be performed, and which may be rotatable about the tubing.

Another object is to provide a work enclosure for welding of aluminum tubing which is adaptable to different sizes of tubing.

DETAILED DESCRIPTION OF THE PREFERRED EMBODIMENT

Figure 1:
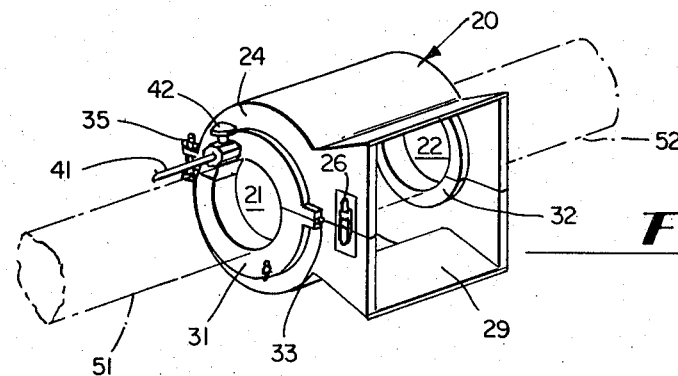
FIG. 1 is a perspective illustration of a work enclosure according to the present invention positioned over abutting sections of aluminum tubing to be spliced.
Figure 2:
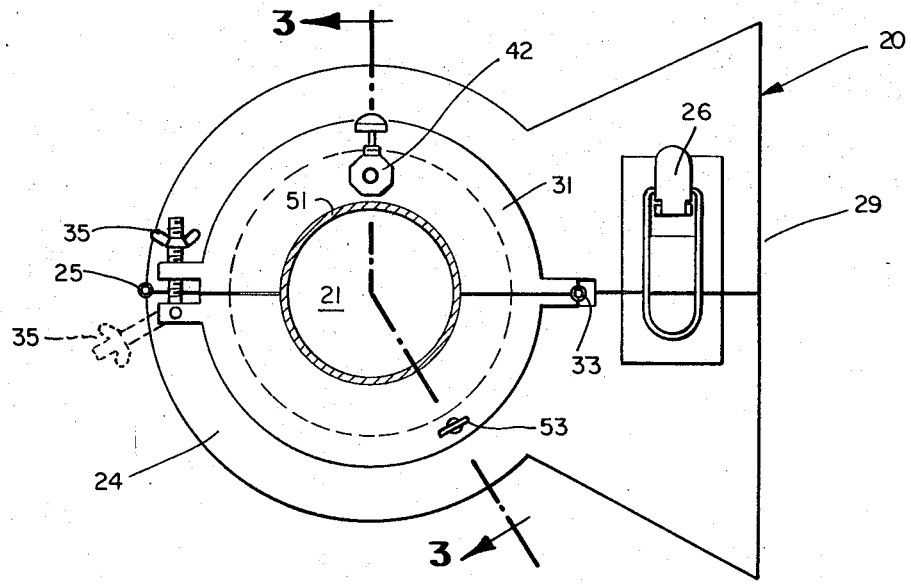
FIG. 2 is an end view of the enclosure.
Figure 3:
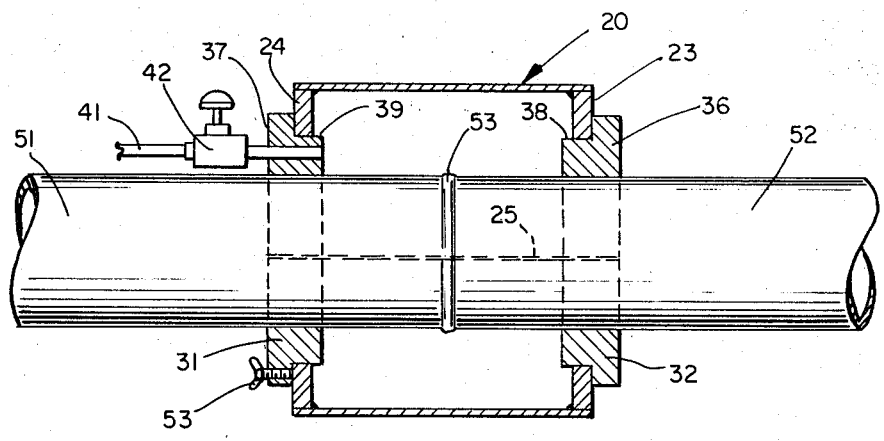
FIG. 3 is a view in section along the line 3—3 of FIG. 2.

Referring now to the drawing, the work enclosure of the present invention comprises a rotatable split hinged cylindrical housing 20 having a hooded open window 29 therein, and a pair of split collars 31 and 32 for securing the housing to the tubing and on which the housing 20 is rotatable. Each of the collars 31 and 32 consists of two halves hinged at one side, as at 33 in FIG. 2. At the other side, the split collar-halves are provided with an eye bolt and wing nut, as at 35, so that the split collar may be clamp fitted tightly about the tubing. The circumferential surfaces of the collars 31, 32, are provided with radially extending outer flanges 36 and 37 and inner shoulders 38 and 39 forming bearing surfaces, as seen best in FIG. 3.

The split housing 20 has side openings 21 and 22, one at each end, the surfaces of which are adapted to engage the shoulders 38 and 39 of the split collars. The exterior surfaces of the end walls 23 and 24 of the housing 20 abut against the inward radial surfaces of the flanges 36 and 37. The housing 20 is provided at one side with a piano hinge 25 and is provided at the opposite side with a hooded open window 29 through which the welding electrode is manipulated. Draw-and-snap locks 26 with alignment guides are used to lock together the halves of the split housing 20.

One of the split collars, collar 31 in the present illustration, is provided with a hose connection 41 with a valve 42 for supplying inert gas to the interior housing 20. The hose connection 41 extends through the body of the split collar 31 radially inward of the shoulder or bearing surface 39, as seen clearly in FIG. 3. A thumb screw 53 is provided in the flange of at least one of the split collars so as to enable the workman to releasably lock the housing 20 against rotational movement about the split collars 31 and 32.

OPERATION

Assume that aluminum tubing 51 is to be butt-welded to aluminum tubing 52 at joint 53. The workman first clamps split collar 31 about the aluminum tubing section 51 at a point spaced from the joint 53 by approximately half the width of the housing 20. The other split collar 32 is then applied loosely to the tubing section 52. The two sections 51 and 52 are held axially aligned. The hinged split housing 20 is then applied about the tubings between the collars 31 and 32 with the circular surfaces of the side openings 21 and 22 positioned to engage the shoulders or bearing surfaces 39 and 38 of the collars 31 and 32. The loose collar 32 is now moved along the tubing 52 toward the fixed tight collar 31 to confine the housing between the collars and to provide a snug but slidable engagement of the inward radial surfaces of the flanges 36 and 37 with the outer surfaces 23 and 24 of the end walls of the housing 20. The collar 32 is then clamped tightly to the tubing section 52 by tightening the wing nut on the eye bolt 35.

To make the weld, the welder inserts the welding electrode through the window 29 of the housing 20. After that portion of the weld which is accessible from one position of the housing is completed, the welder loosens the thumb screw 53, rotates the housing 20 a fraction of a revolution on the collars 31 and 32 sufficient to expose a new section of the butt joint 53, and then locks the housing 20 in its new rotational position on the collars. This action is repeated until the weld is complete.

It should be pointed out that while a different set of split collars 31 and 32 is required for each different diameter of aluminum tubing, the invention contemplates that all split collars will have the same outside diameter, so that the same split housing 20 may be used for different diameters of aluminum tubings.

What is claimed is:

1. A work enclosure for facilitating inert gas welding of cylindrical tubing, said enclosure comprising:

a. first and second split cylindrical collars, means for clamping said collars about said tubing at spaced-apart individually selected positions, one on each side of an annular joint to be welded;

b. said collars having an annular outer flange and a smaller-diameter annular bearing surface inward of the flange, toward said joint the bearing surfaces of the two collars adapted to face each other when said collars are clamped about said tubing at said
c. a split cylindrical housing;
d. said housing having a cylindrical body portion with circular sidewalls, each of said sidewalls having a circular opening therein of a diameter corresponding to that of the bearing surfaces of said collar;
e. said circular openings in the sidewalls of said housing having means receiving the bearing surfaces of said collars, said collar flanges having means abutting against and confining said housing therebetween;
f. said housing having an access opening through which welding electrodes may be inserted; and
g. releasable locking means for releasably locking said housing against rotation on said bearing surfaces, and rendering the angular position of said housing on said bearing surface changeable from time to time to move said access opening stepwise about said tubing to permit welding of the annular joint by the welding electrodes.

2. A work enclosure according to claim 1 characterized in that means are provided for supplying inert gas to the interior of said housing, said means including a supply line into and through one of said collars.

3. A work enclosure according to claim 2 characterized in that said access opening in said housing comprises a hooded open window at the side of said housing opposite said housing hinge.

* * * * *

UNITED STATES PATENT OFFICE
CERTIFICATE OF CORRECTION 379-70

Patent No. 3,688,070  Dated August 29, 1972

Inventor(s) Harry J. Smith

It is certified that error appears in the above-identified patent and that said Letters Patent are hereby corrected as shown below:

Column 3, line 5, after the words "about said tubing at said" insert the words ---spaced-apart positions;---.

Signed and sealed this 23rd day of January 1973.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,688,070     Dated August 29, 1972

Inventor(s) Harry J. Smith

It is certified that error appears in the above-identified patent and that said Letters Patent are hereby corrected as shown below:

On the cover page correct the address of the inventor from Chester, Pennsylvania to West Chester, Pennsylvania.

Signed and sealed this 15th day of May 1973.

(SEAL)
Attest:

EDWARD M. FLETCHER, JR.
Attesting Officer

ROBERT GOTTSCHALK
Commissioner of Patents